United States Patent
Wang et al.

(10) Patent No.: US 9,984,112 B1
(45) Date of Patent: May 29, 2018

(54) DYNAMICALLY ADJUSTABLE TRANSACTION LOG

(71) Applicant: EMC Corporation, Hopkinton, MA (US)

(72) Inventors: Yubing Wang, Southborough, MA (US); Philippe Armangau, Acton, MA (US); Christopher A. Seibel, Walpole, MA (US); Jean-Pierre Bono, Westborough, MA (US); Yining Si, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 385 days.

(21) Appl. No.: 14/755,001

(22) Filed: Jun. 30, 2015

(51) Int. Cl.
*G06F 17/30* (2006.01)

(52) U.S. Cl.
CPC .. *G06F 17/30371* (2013.01); *G06F 17/30321* (2013.01); *G06F 17/30368* (2013.01)

(58) Field of Classification Search
CPC combination set(s) only.
See application file for complete search history.

(56) References Cited

U.S. PATENT DOCUMENTS

| 5,996,054 A * | 11/1999 | Ledain ............... G06F 17/30144 711/112 |
| 7,631,009 B1 | 12/2009 | Patel et al. |
| 2014/0310483 A1 * | 10/2014 | Bennett ................ G06F 12/00 711/154 |
| 2016/0110121 A1 * | 4/2016 | Singh .................... G06F 3/0613 711/156 |

OTHER PUBLICATIONS

Uresh Vahalia, et al.; "Metadata Logging in an NFS Server"; Proceedings of the Summer 1993; Usenix Technical Conference; Jun. 1993; pp. 111-128.

* cited by examiner

*Primary Examiner* — Shyue Jiunn Hwa
(74) *Attorney, Agent, or Firm* — BainwoodHuang (57) ABSTRACT

Managing a circular transaction log in a data storage system includes receiving requests specifying data to be written to a data object served by the data storage system, and adding log entries to the log containing data specified by the requests at or after a tail of the log and before a head of the log. In response to a trigger event, a size of the log is dynamically increased by inserting additional storage space into the log at or after the tail and before the head, to account for differences between the rate at which entries are added to the log and the rate at which entries are flushed from the log. The disclosed technique may further operate to find the slot position in which each log entry is stored, based on the identifier of the log entry, after inserting the additional storage space into the log.

20 Claims, 8 Drawing Sheets

DYNAMICALLY ADJUSTABLE TRANSACTION LOG

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Some data storage systems employ transaction logs for temporarily storing changes in data of data objects served by the data storage systems. For example, a data storage system serving a data object may receive a request from a host machine to perform a write operation on that data object. In response to receiving the request, the data storage system temporarily stores the data specified in the request as a log entry in a transaction log. Once the transaction log has stored the transaction, the data storage system can acknowledge back to the host that the operation specified in the request has been completed. Subsequently, the data storage system can synchronize the data stored in the transaction log to the data object. The data storage system can then retire the transaction from the log, e.g., to make room for new transactions.

A transaction log may be arranged as a circular buffer with a head and a tail, with new log entries placed at the tail of the log, and older log entries flushed from the head.

SUMMARY

Many previous transaction logs have had fixed sizes. Unfortunately, in circumstances where log entries are not being flushed as quickly as log entries are being written, the log tail may catch up with the log head, at which point the log becomes full. Since the logs in previous solutions have had fixed sizes, write requests arriving when the log is full must be paused or rejected, causing significant delays to applications writing to the data storage system. To avoid such delays, previous systems have set the size of their logs to large fixed values, in an attempt to avoid filling up the logs. Such previous approaches accordingly may use an excessively large log regardless of the actual, typical needs of the system. Additionally, some previous systems address a log-full condition by copying the contents of the log to a larger space. However, this solution involves copying log entries from the old log to the new log prior to resuming operation with the new, larger sized log.

In contrast with the prior approach, an improved technique for managing a circular transaction log in a data storage system includes receiving, from a set of requestors, requests specifying data to be written to a data object served by the data storage system, and adding log entries to the log containing data specified by the requests at or after the tail of the log and before the head of the log. In response to a trigger event, a size of the log is dynamically increased by inserting additional storage space into the log at or after the tail and before the head. The trigger event may indicate that the log has reached a threshold level of fullness. Alternatively, the trigger event may indicate that a rate at which requests were received during a previous time period exceeds a threshold, so that the size of the log may be dynamically increased in anticipation of storing large numbers of log entries due to the high rate of received requests, without becoming full.

In another aspect of the technique, log entries are flushed from the log at or after the head of the log and before the tail, and the trigger event may indicate that a rate at which log entries were flushed from the log during a previous time period fell below a threshold, so that the size of log may be dynamically increased in anticipation of storing large numbers of log entries due to the low rate of flushing.

In some examples, the log is implemented within a range of contiguous physical addresses of a file system operated by the data storage system, and inserting additional storage space into the log includes provisioning an extent of contiguous physical addresses to the file system for use by the log to store log entries.

In another example, the log is dynamically contracted upon detection of a contraction trigger indicating that previously inserted additional storage space is no longer needed to store log entries, and the previously inserted storage space is removed from the log such that the previously provisioned extent of contiguous physical addresses is returned, and is no longer available to the log and may be provisioned for another purpose.

In another example, after inserting a first set of additional storage space into the log, a subsequent trigger event may be detected indicating that the log has again reached a threshold level of fullness. In that case a second set of additional storage space may be added to the log, but only in the event that log entries have been flushed from the log up to and including the log entry that was the last log entry added to the log prior to using the first set of additional storage space to store any log entries. Further additional sets of storage may also be added using the disclosed technique, also with the requirement that log entries first be flushed up to and including the last log entry added to the log prior to the use of the preceding additional set of storage.

Advantageously, the improved technique enables operation in which a log need not be set to an excessively large size, in order to avoid the costly delays associated with moving to a new fixed size log upon the occurrence of a log-full event. Instead, the improved technique allows a log to be dynamically sized based on the actual, typical needs of the data storage system during operation. Additionally, in the event that a log-full condition is encountered, the improved technique conveniently increases the size of the log without requiring costly copying of log entries from the old log to a new larger sized log.

Certain embodiments are directed to a method for managing a circular transaction log in a data storage system, the log having a head and a tail, the method including receiving, from a set of requestors, requests specifying data to be written to a data object served by the data storage system. In response to receiving the requests, the method adds log entries to the log, the log entries containing data specified by the requests, the log entries being added to the log at or after the tail of the log and before the head, the tail moving forward within the log as the log entries are added. The method includes dynamically increasing, in response to a trigger event, a size of the log by inserting additional storage space into the log at or after the tail and before the head.

Other embodiments are directed to a data storage system constructed and arranged to perform the method described above. Still other embodiments are directed to a computer program product. The computer program product stores instructions which, when executed on control circuitry of a data storage system, cause the data storage system to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing a circular transaction log in a data storage system includes receiving, from a set of hosts, requests specifying data to be written to a data object served by the data storage system, and adding log entries to the log containing data specified by the requests at or after the tail of the log and before the head of the log. In response to a trigger event, a size of the log is dynamically increased by inserting additional storage space into the log at or after the tail and before the head. The trigger event may indicate that the log has reached a threshold level of fullness, or that the tail of the log has reached the head of the log. Alternatively, the trigger event may indicate that a rate at which requests were received during a previous time period exceeds a threshold, or that a rate at which log entries were flushed from the log during a previous time period fell below a threshold.

Figure 1:
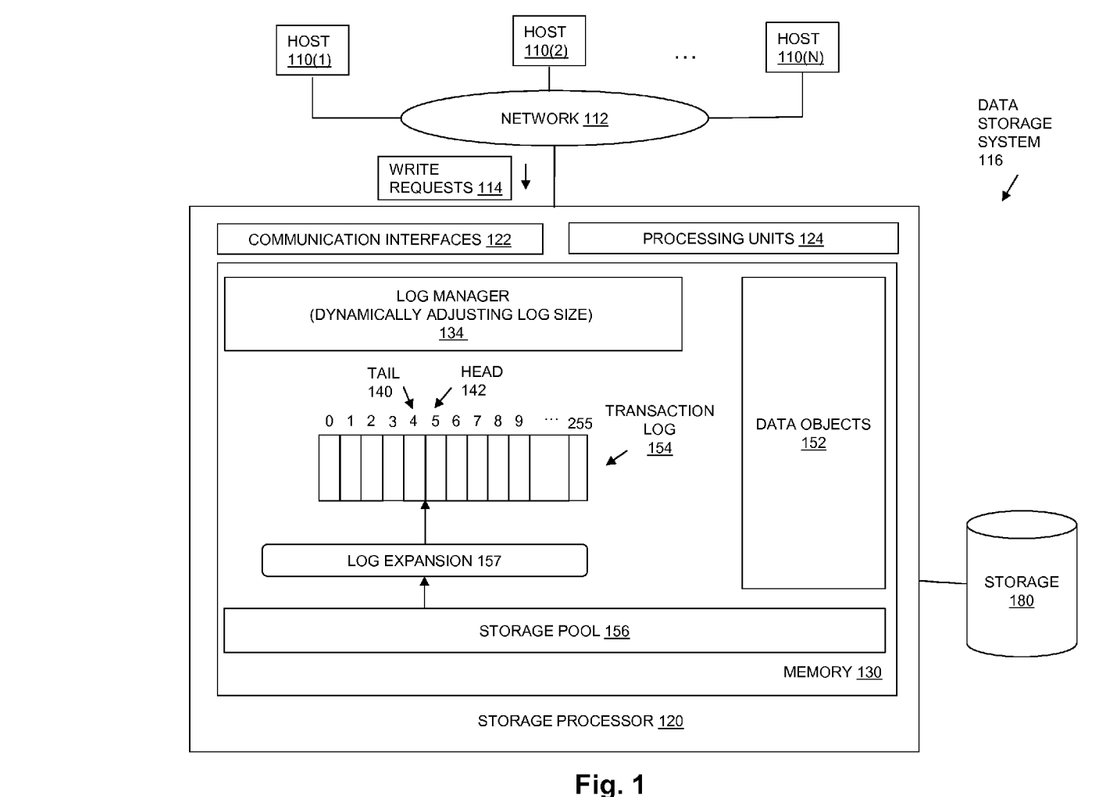
FIG. 1 is a block diagram showing a data storage system including an embodiment of the disclosed technique, in an example of an environment in which embodiments of the disclosed technique may be practiced.

FIG. 1 shows an example environment in which embodiments of the improved technique hereof can be practiced. Multiple host computing devices ("hosts"), shown as devices 110(1) through 110(N), access a data storage system 116 over a network 112. The data storage system 116 includes a storage processor, or "SP," 120 and storage 180. The data storage system 116 may include multiple SPs like the SP 120. In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host I/Os.

The storage 180 may, for example, include one or more RAID groups, where each RAID group is composed of multiple disk drives. The disk drives may include magnetic disk drives, electronic flash drives, optical drives, and/or other types of drives. In a typical example, each RAID group may include disk drives of a common type that provide similar performance.

The network 112 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive I/O requests, including but not limited to write requests 114, according to block-based and/or file-based protocols, and to respond to such I/O requests by reading and/or writing the storage 180. Although the data storage system 116 may be capable of receiving and processing both block-based requests and file-based requests, the invention hereof is not limited to data storage systems that can do both.

The SP 120 is seen to include one or more communication interfaces 122, a set of processing units 124, and memory 130. The communication interfaces 122 include, for example, SCSI target adapters and network interface adapters for converting electronic and/or optical signals received over the network 112 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and/or daemons.

As further shown in FIG. 1, the memory 130 includes data objects 152. Data objects 152 are served to the hosts 110(1-N), and the write requests 114 are directed to data objects 152. Data objects 152 are served to the hosts 110(1-N) by the data storage system 116. For example, data objects 152 may include objects served through file-based storage services, such as file systems or the like, and/or file-based virtual volumes (VVols). Alternatively, or in addition, data objects 152 may include objects served through block-based storage services, such as logical disks or logical units (LUNs), and/or block-based virtual volumes (VVols). The data storage system 116 may expose the data objects 152 to hosts(1-N) for access by the hosts(1-N) in accordance with respective storage service protocols. Thus, data storage system 116 may expose block-based data objects (e.g., LUNs and/or block-based VVols) through Fiber Channel or iSCSI protocols, and/or may expose file-based objects (e.g., file systems and/or file-based VVols) using NFS, CIFS, or SMB protocols.

Storage pool 156 organizes elements of the storage 180 into units of storage used by the data storage system 116 while providing one or more storage services. For example, in one embodiment, the storage pool 156 organizes elements of the storage 180 into "slices". A "slice" is an example of a unit of storage space (e.g. 256 megabytes or 1 gigabytes in size), which is derived from storage 180. The storage pool 156 allocates slices of the storage 180 to be used to form data objects 152. For example, storage pool 156 may allocate slices to objects in data objects 152 that support file-based storage services, such as file systems or the like, and/or file-based virtual volumes (VVols). Alternatively, the storage pool 156 may allocate slices for objects in data objects 152 that support block-based storage services, such as logical disks or logical units (LUNs), and/or block-based virtual volumes (VVols). Storage pool 156 may also de-allocate slices from data objects 152 if the storage provided by the slices is no longer required. In this way, data objects 152 for both file-based and block-based storage services are built upon units of storage managed by the storage pool 156.

The memory 130 further includes (i.e., realizes by operation of programming code) a log manager 134. When the storage processor 120 receives one of write requests 114, the data specified by the request is stored by log manager 134 as a log entry in transaction log 154. Once the data specified by the request is stored in transaction log 154, the data storage system 116 can acknowledge back to the host that issued the request that the operation specified in the request has been completed. In an example, storage of log entries into the transaction log 154 is persistent; however, this is merely an example, as storage may be volatile in implementations that provide no guarantees of error-free operation.

Transaction log 154 is arranged as a circular buffer, and includes a head 142 and a tail 140. In the example of FIG. 1, log 154 initially includes 256 slots, from slot 0 through slot 255. Generally speaking, new log entries are placed in sequential slots within the log 154, at or after tail 140 and before head 142. As log entries are added, tail 140 moves forward within the log 154. Whenever tail 140 reaches the end of the log 154, it wraps around to the beginning of the log 154, and new log entries may continue to be added using available slots starting from the beginning of the log 154.

In response to a trigger event, log manager 134 dynamically increases the size of log 154, by inserting additional storage space into log 154 at or after the tail 140 and before the head 142. For example, a trigger event may indicate that log 154 has reached a threshold level of fullness. One such threshold level of fullness may occur when tail 140 indicates a slot immediately preceding the slot indicated by head 142. In that situation, prior to insertion of log expansion 157, only one more slot is available to store a log entry. Specifically, only the slot indicated by the tail 140 (i.e. slot 4) is available to store a log entry. By inserting log expansion 157 after the tail 140 (i.e. after slot 4), and before head 142 (i.e. before slot 5), the disclosed technique enables log entries to continue to be added to log 154 after a log entry is stored in the slot indicated by the tail 140 (i.e. in slot 4), using slots within the log expansion 157, without requiring that log entries be flushed such that head 142 advances beyond its current slot (i.e. slot 5). In this way the disclosed technique operates to dynamically increase the size of log 154 to account for differences between the rate at which entries are added to the log 154, and the rate at which entries are flushed from the log 154, without requiring that entries currently stored in log 154 be moved or copied, e.g. to a larger sized log.

Other trigger events may alternatively cause log manager 134 to increase the size of log 154. For example, one alternative trigger event may indicate that a rate at which requests were received during a previous time period exceeds a threshold. Dynamically increasing the size of the log in response to such a trigger is done in anticipation of storing the large numbers of log entries created due to the high rate of received requests, so that the log does not become full.

Specifically, a rate at which write requests 114 are received by communication interfaces 122 may be calculated over a period of time, and compared to a maximum receipt rate threshold. The maximum receipt rate threshold may, for example, indicate a maximum rate at which write requests can be received, without log 154 becoming full, e.g. a rate that does not exceed the rate at which the data storage system is typically able to flush entries from log 154. A trigger event may accordingly be generated indicating that the rate at which write requests 114 were received exceeded the maximum receipt rate threshold over the preceding time period, and cause the log manager 134 to dynamically increase the size of log 154.

Another alternative trigger event may be based on the rate at which log manager 134 flushes of log entries from transaction log 154. Generally speaking, log entries are flushed from sequential slots within log 154 from the head 142. As log entries are flushed, head 142 moves forward within the log 154. Like the tail 140, whenever the head 142 reaches the end of the log 154, it wraps around to the beginning of log 154 and old log entries continue to be flushed from slots at the beginning of the log space 154. Flushing a log entry from transaction log 154 may be accomplished by synchronizing (i.e. writing) the data from that log entry to an appropriate location or locations within one of the data objects 152. The log manager 134 may then retire the log entry from the log, e.g., to make room for data specified by new requests.

For example, an alternative trigger event may indicate that a rate at which log entries were flushed from the log 154 during a previous time period fell below a minimum flush rate threshold. A rate at which log entries are flushed from log 154 into data objects 152 may be calculated over a period of time, and compared to the minimum flush rate threshold. The minimum flush rate threshold may, for example, indicate a minimum rate at which log entries must be flushed without the log 154 likely to become full, e.g. a rate that keeps up with the rate at which the data storage system typically adds entries to the log 154. A trigger event may accordingly indicate that the rate at which log entries are flushed from log 154 fell below a minimum flush rate threshold, and cause the log manager 134 to dynamically increase the size of log 154.

In one embodiment, log 154 may be implemented within a range of contiguous physical addresses of a file system operated by the data storage system 116, and supported by storage pool 156. For example, such a file system may be or include one of the data objects 152. In such an embodiment, inserting log expansion 157 into the log 154 includes provisioning an extent of contiguous physical addresses to the file system for use by the log 154 to store log entries. For example, the extent of contiguous physical addresses provisioned may be supported by a slice of storage or the like allocated from storage pool 156.

The log manager 134 may also dynamically contract transaction log 154 in response to contraction trigger. For example, log manager 134 may repeatedly detect that the log 154 includes a total number of free slots, i.e. slots that are not occupied by log entries, that is greater than the number of slots within log expansion 157, indicating that log expansion 157 is no longer needed to prevent log 154 from becoming full. In response to such a contraction trigger, log manager 134 may operate to remove log expansion 157 from the log, for example such that the extent of contiguous physical addresses previously provisioned is no longer available for use by the log to store log entries and may be provisioned for another purpose.

In response to a second trigger event that occurs after inserting log expansion 157 into log 154, the disclosed technique detects whether log entries have been flushed from the log up to and including the last log entry added to the log prior to using log expansion 157 to store any log entries. The disclosed technique only increases the size of the log again if all log entries have been flushed up to and including the last log entry added to the log prior to using log expansion 157 to store any log entries. For example, in FIG. 1, in which log expansion 157 was inserted between slots 4 and 5 of log 154, the technique detects whether log entries have been flushed up to and including the log entry that was stored in slot 4, since that log entry would be the last log entry added to the log prior to using log expansion 157 to store any log entries. The size of the log 154 will be additionally increased (i.e. by adding a second expansion to the log) only in response to detecting that log entries have been flushed up to and including the last log entry added to the log prior to using log expansion 157 to store any log entries.

Figure 2:
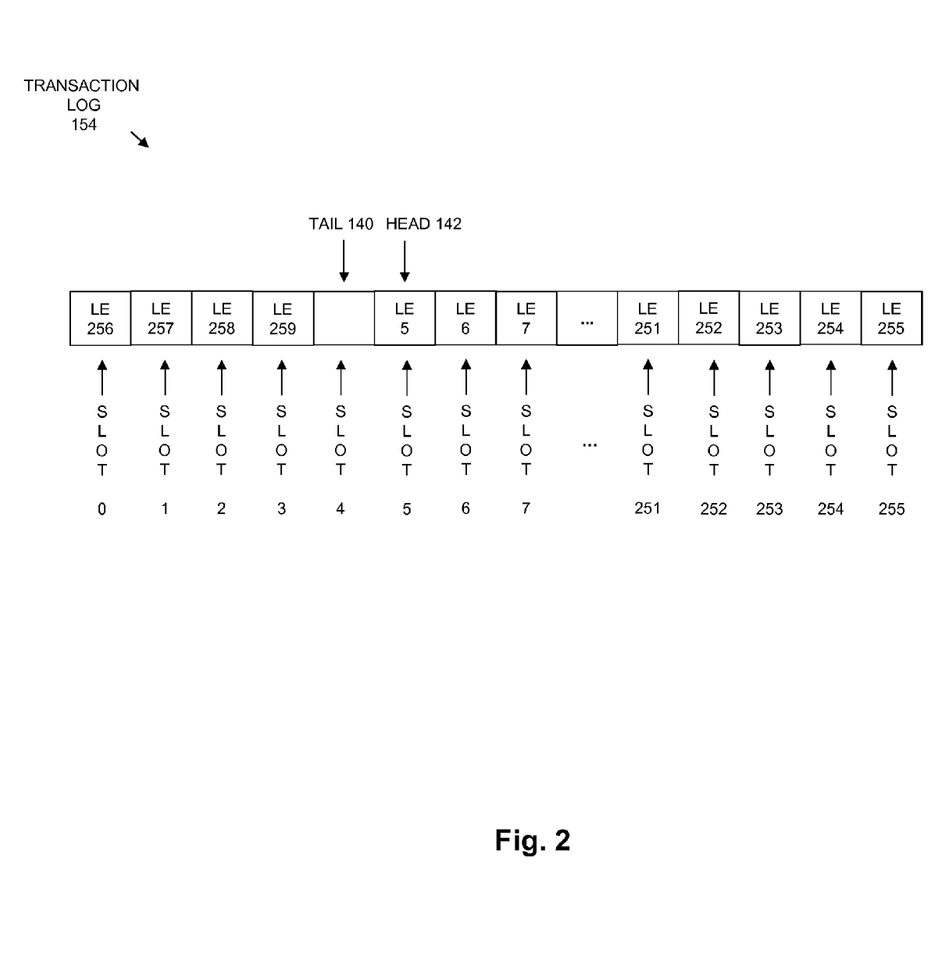
FIG. 2 is a block diagram showing an example of a log that has reached a threshold level of fullness.

FIG. 2 is a block diagram illustrating an example of a transaction log 154 having reached a threshold level of fullness. As shown in FIG. 2, the log 154 may be divided into "slots", each of which may, for example, correspond to a "block" of storage, which may be 8 KB in size, although blocks may be provided in any suitable denomination. While in the example of FIG. 2, each log entry is shown in a single slot for purposes of explanation, the disclosed technique is not limited to such an embodiment, and alternative embodiments may operate on logs in which log entries span multiple slots, and/or on logs in which individual log entries may extend over varying numbers of slots.

In the example of FIG. 2, slots 5-255 of transaction log 154 have been used for log entries 5-255 (LE 5 through LE 255). Slots 0-3 have been used for log entries 256-259 (LE 256 through LE 259). The tail 140 indicates slot 4, which is the last available slot, since head 142 indicates slot 5. Accordingly, only one slot is available for storing a log entry, and log 154 is therefore nearly full. In one embodiment, when only a single slot remains available for storing a log entry, then log 154 is considered to have reached a threshold level of fullness, and accordingly a trigger event occurs causing the size of the log 154 to be dynamically increased.

Figure 3:
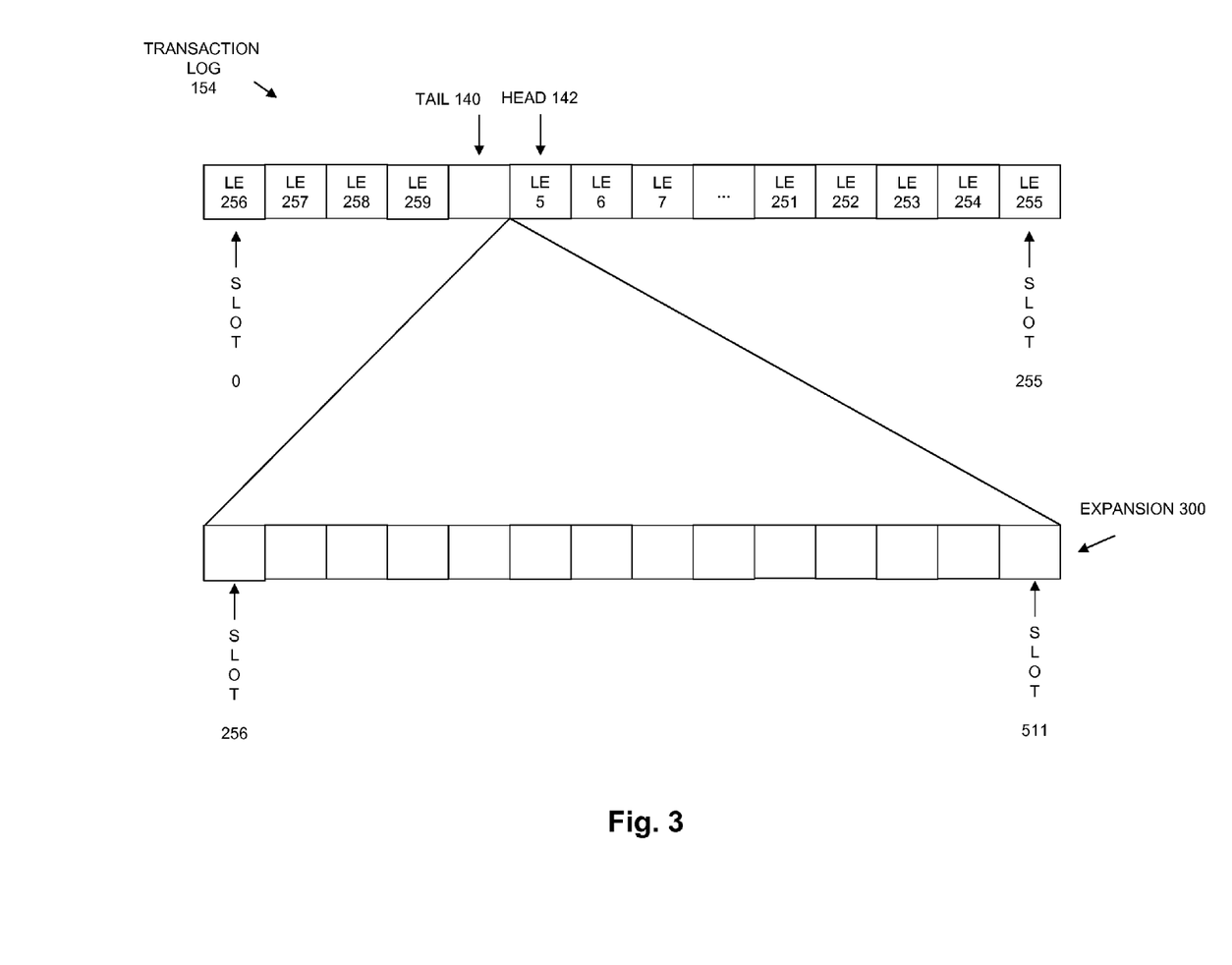
FIG. 3 is a block diagram showing an example of a log after insertion of additional storage.

FIG. 3 is a block diagram showing an example of transaction log 134 after insertion of additional storage, i.e. after insertion of expansion 300 at or after tail 140 and before head 142. Specifically, in the example of FIG. 3, expansion 300 has been added to log 134 at a position between slot 4 and slot 5. As shown in the example of FIG. 3, expansion 300 adds 256 more slots to transaction log 154, i.e. slots 256 through 511. However, the disclosed technique is able to use the slots in a first expansion 300 before slots 5 through 255 have been flushed, as further described below. After a first expansion has been made, prior to making each subsequent expansion, flushing must be performed with regard to log entries up to and including the last log entry added to the log prior to using the preceding log expansion, as also further described below.

Figure 4:
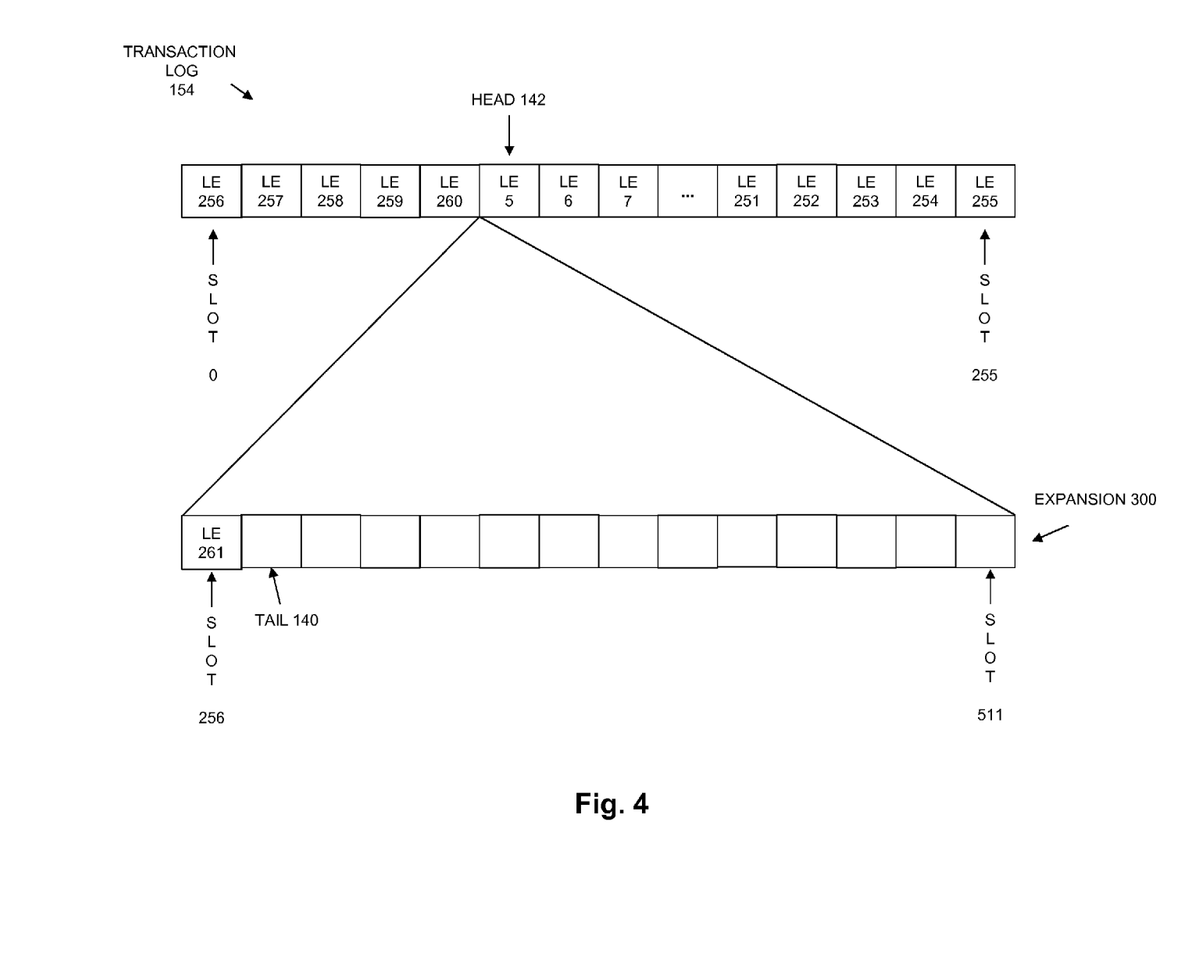
FIG. 4 is a block diagram showing the example from FIG. 3, after storing a log entry using the additional storage.

FIG. 4 is a block diagram showing the example from FIG. 3, after storing a log entry using the additional storage space of expansion 300. As shown in FIG. 4, two more log entries have been added to log 154. Specifically, log entry 260 (LE 260) has been added into slot 4, and a next log entry, log entry 261 (LE 261), has been added into slot 256 within expansion 300. Tail 140 has accordingly been advanced to indicate slot 257, which is the next slot that will be used to store a log entry.

Figure 5:
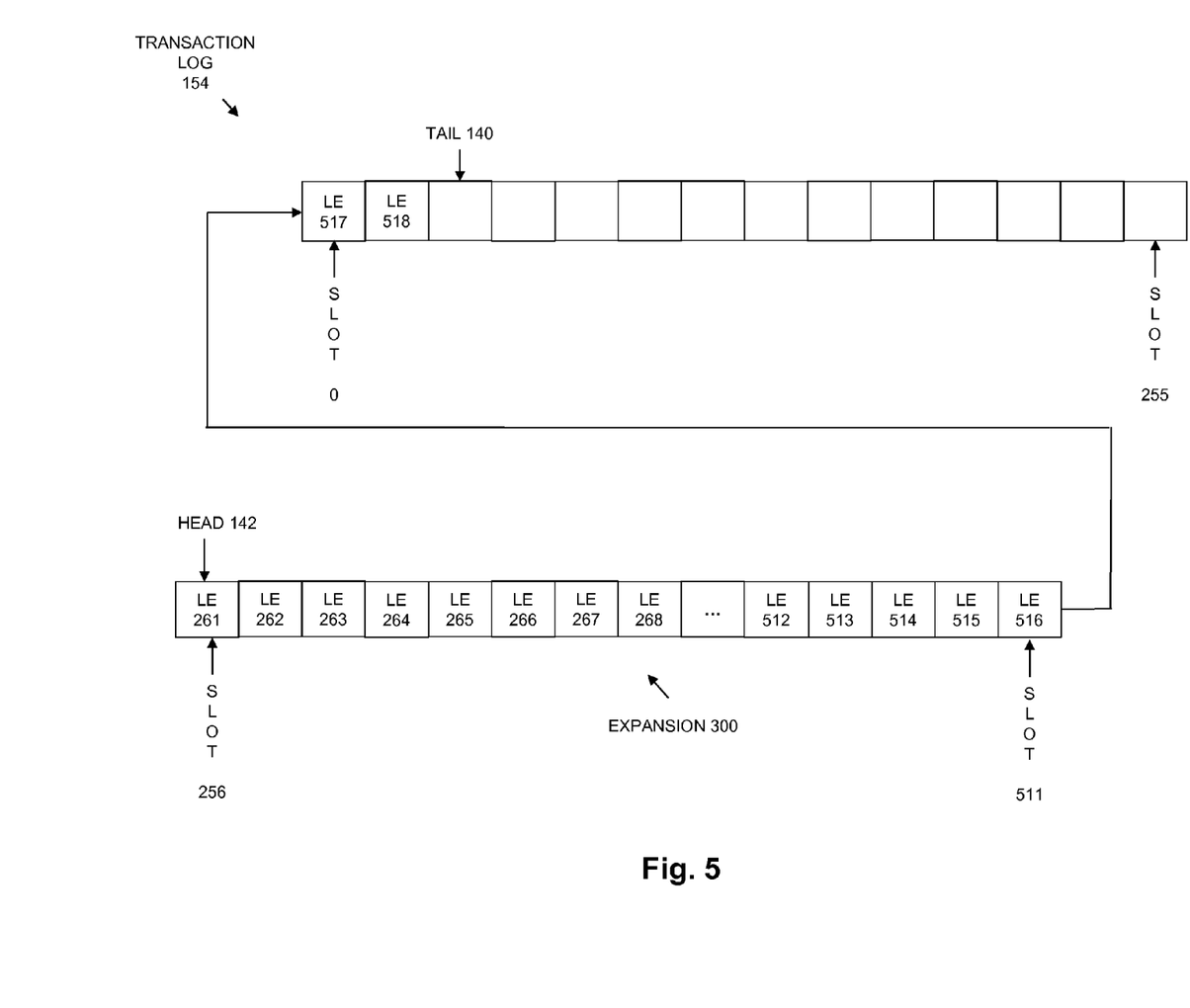
FIG. 5 is a block diagram showing the example from FIG. 4, following subsequent storing of additional log entries wrapping back to the beginning of the log from the additional storage.

FIG. 5 is a block diagram showing the example from FIG. 4, following subsequent receipt of additional log entries wrapping back to the start of the log from the additional storage. As shown in the example of FIG. 5, slots 256 through 511 in expansion 300 have been used to store log entry 261 (LE 261) through log entry 516 (LE 516). Following storing log entry 516 (LE 516) into slot 511, which is the slot at the end of log 154, the disclosed technique wraps back to slot 0 to store log entry 517 (LE 517), followed by storing log entry 518 (LE 518) in slot 1. Tail 140 has accordingly been advanced to indicate slot 2, which is the next slot at which a log entry may be added.

Figure 6:
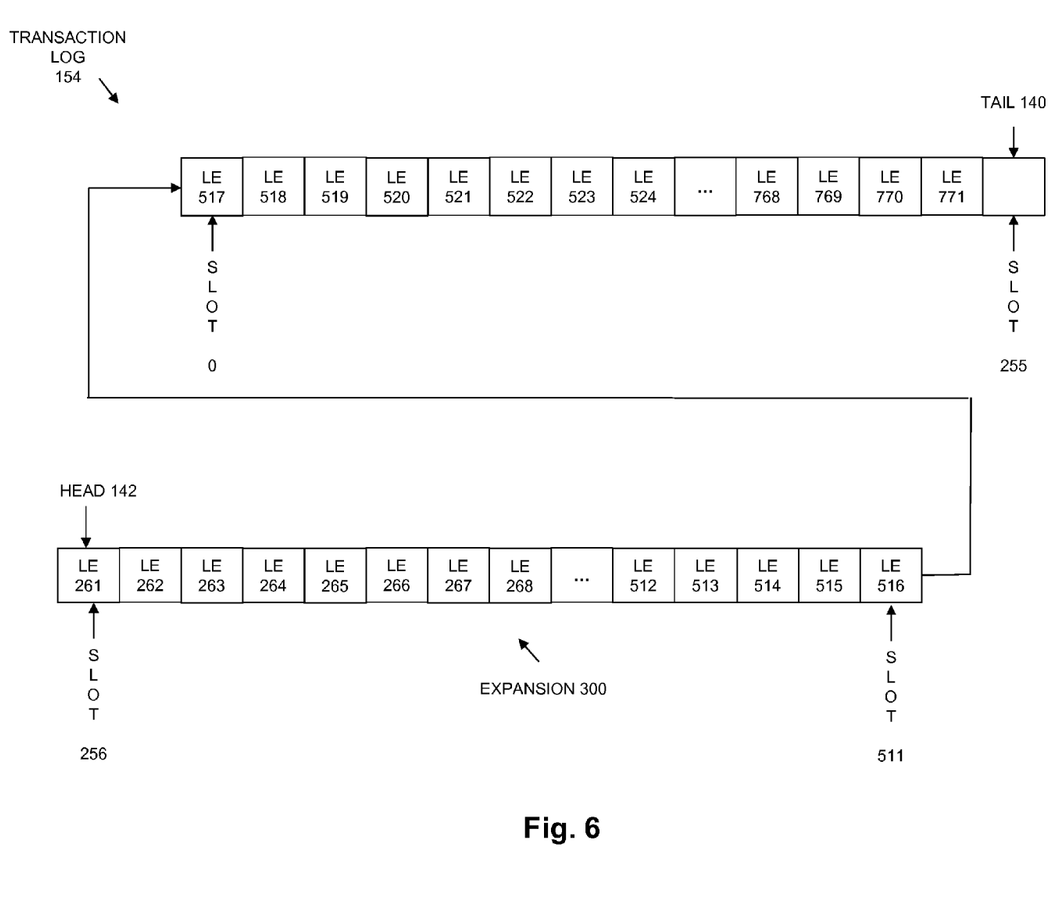
FIG. 6 is a block diagram showing the example from FIG. 5 following subsequent storing of additional log entries causing the log to again reach a threshold level of fullness.

FIG. 6 is a block diagram showing the example from FIG. 5 following subsequent receipt of additional log entries causing the log to again reach a threshold level of fullness. As shown in FIG. 6, slots 2 through 254 have been used to store log entries 519 through 771 (LE 519 through LE 771). Tail 140 indicates slot 255, which is the next slot that may be used to store a log entry. Since head 142 indicates slot 256, only one slot is available to store new log entries. Because only a single slot remains available, the log 154 is again considered to have reached a threshold level of fullness, and accordingly a trigger event again occurs. However, since log 154 has already been increased in size by the addition of expansion 300, the disclosed technique performs an additional test that must be satisfied before the size of log 154 can again be dynamically increased. Specifically, after inserting a first set of additional storage space (e.g. expansion 300) into the log 154, a second set of additional storage space may be only be added to the log 154 in the event that log entries have been flushed from the log up to and including the last log entry stored in the log prior to using the additional space provided by expansion 300 to store log entries. As shown in FIG. 4, the last log entry added to log 154 prior to using expansion 300 to store a log entry was log entry 260 (LE 260).

In order to determine whether log entries have been flushed from the log 154 up to and including log entry 260 (LE 260), the disclosed technique examines the log entry currently indicated by head 142, since all log entries preceding the log entry indicated by head 142 have been flushed. In other words, in an embodiment in which log entries are associated with sequential identifiers indicating their order within the log such that log entry 0 precedes log entry 1 in the log, log entry 1 precedes log entry 2 in the log, and so on. The log entry indicated by head 142 is the next log entry to be flushed, and all log entries having lower identifiers have previously been flushed. In the example of FIG. 6, head 142 indicates log entry 261 (LE 261). Accordingly, since log entry 260 (LE 260) precedes log entry 261 (LE 261) in the log, log entry 260 (LE 260) has been flushed, and a second set of additional storage space may be added using the disclosed technique to the log 154.

Alternatively, in the event that all log entries have not been flushed up to and including the last log entry added to the log 154 prior to adding log entries into the expansion 300, the disclosed technique will not add a second set of additional storage to the log 154 until such flushing has been accomplished.

Figure 7:
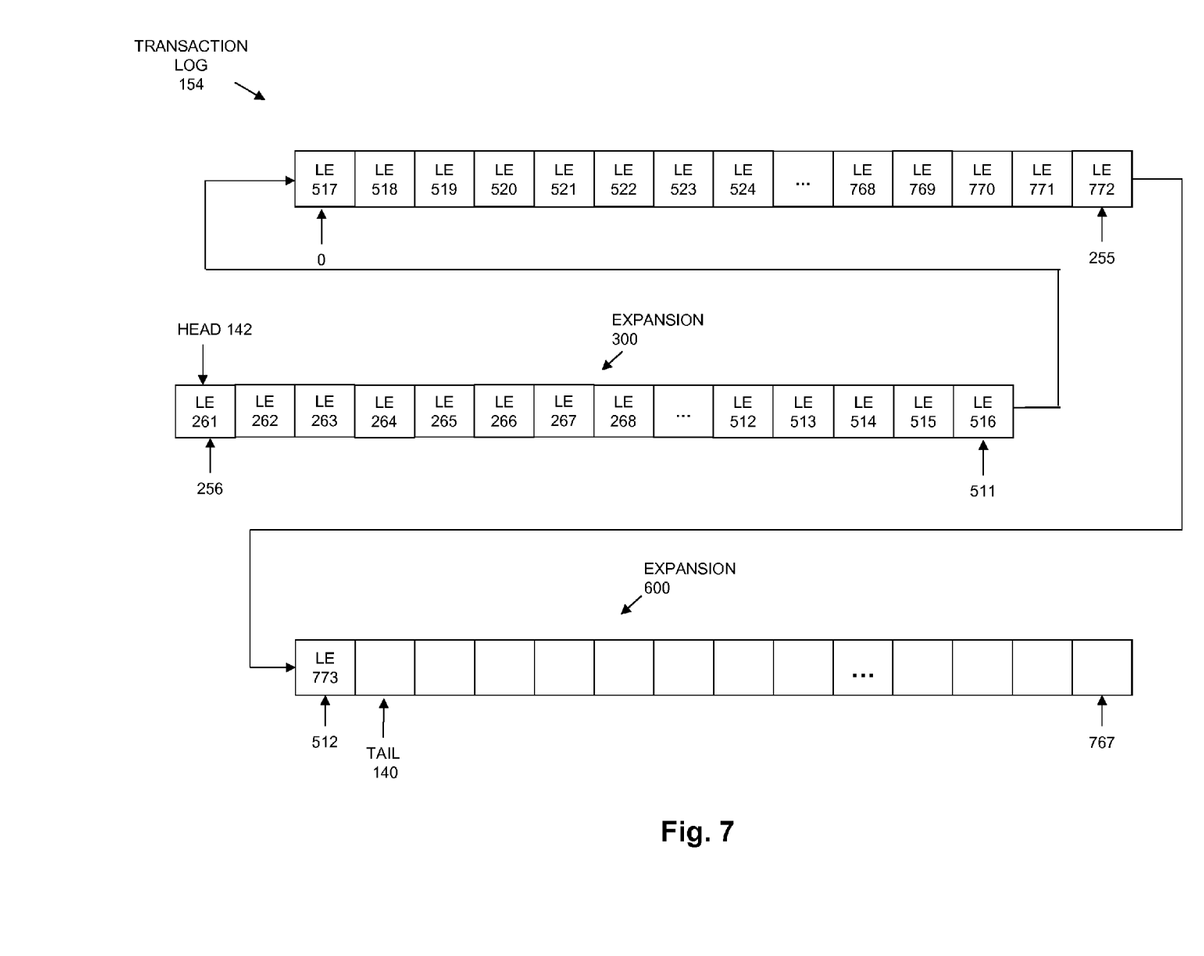
FIG. 7 is a block diagram showing the example from FIG. 6 following a second insertion of additional storage and using the additional storage to store a log entry.

FIG. 7 is a block diagram showing the example from FIG. 6 following a second insertion of additional storage. Specifically, FIG. 7 shows log 154 following insertion of expansion 600. In the example of FIG. 7, log entry 772 (LE 772) has been stored in slot 255, and the next received log entry, log entry 773 (LE 773), and been stored in the first slot of expansion 600, i.e. slot 512. The tail has accordingly been advanced to indicate the next available slot, i.e. slot 513.

In the event that after expansion 600 is inserted into log 154, subsequent additional log entries are received causing the log to again reach a threshold level of fullness (e.g. only a single slot available to store a log entry), the size of the log may continue to be dynamically increased. However, as with the determination of whether a second expansion (i.e. expansion 600) could be inserted following insertion of the first expansion (i.e. expansion 300), the disclosed technique determines whether all log entries have been flushed from the log up to and including the last log entry added to the log prior to using the immediately preceding expansion to store a log entry. For example, prior to inserting another expansion after insertion of expansion 600, the disclosed technique would ensure that all log entries up to and including log entry 772 (LE 772) have been flushed from the log, since log entry 772 (LE 772) was the last log entry added to the log prior to using expansion 600 to store a log entry (prior to using expansion 600 to store log entry 773 (LE 773)).

As described above, the disclosed technique dynamically changes the size of the log 154 by inserting additional storage space into the log. The disclosed technique further provides the ability to find the slot position in which each log entry is stored, based on the identifier of the log entry, after inserting the additional storage space into the log. As mentioned above, each log entry may be associated with a unique integer identifier when it is added to log 154. For example, a first log entry added to the log 154 may have an identifier of 0, a second log entry added to the log 154 may have an identifier of 1, a third log entry added to the log 154 may have a log entry identifier of 2, and so on for all log entries added to log 154. As described above, log entries are added to sequential slots in log 154 starting from slot 0. Accordingly, a log entry with an identifier of 0 is added in slot 0, a log entry with an identifier of 1 is added to slot 1, etc., with the log entry having an identifier of 256 using slot 0 after the log entry having identifier 0 has been flushed.

Prior to any expansion of the log 154, the slot number ("slotPosition") for a given log entry may simply be calculated from the identifier of the log entry ("LogEntryID") by performing a modulo operation ("%") as follows, for a log of size 256:

slotPosition=LogEntryID % 256

When adding a first expansion to the log, the disclosed technique stores the identifier of the last log entry added to the log 154 prior to adding any log entries to the first expansion as firstExpansionLogEntryID. For example, when adding expansion 300 as shown in FIG. 4, the identifier of the last log entry added prior to using expansion 300 is 260. After adding the expansion 300 to log 154, the disclosed technique then calculates the slot position for a given log entry having an identifier of LogEntryID using firstExpansionLogEntryID, and the new log size of 512, as follows:

firstExpansionLogEntryID=260
If (LogEntryID<=firstExpansionLogEntryID)
    slotPosition=LogEntryID % 256
Else
    firstExpansionOffset=firstExpansionLogEntryID % 256+1
    slotPosition=(LogEntryID−firstExpansionOffset) % 512

Similarly, when adding a second expansion to the log, the disclosed technique stores the identifier of the last log entry added to the log 154 prior to adding any log entries to the second expansion as secondExpansionLogEntryID. For example, when adding second expansion 600, as shown in FIG. 7 the identifier of the last log entry added prior to using expansion 600 is 772. After adding the expansion 600 to log 154, the disclosed technique can then find the slot number for a given log entry having an identifier of LogEntryID using secondExpansionLogEntryID and the new log size of 768 as follows:

firstExpansionLogEntryID=260;
secondExpansionLogEntryID=772;
If (LogEntryID<=firstExpansionLogEntryID)
{
    slotPosition=LogEntryID % 256;
}
Else if (LogEntryID>firstExpansionLogEntryID &&
    LogEntryID<=secondExpansionLogEntryID)
{
    firstExpansionOffset=firstExpansionLogEntryID % 256+1;
    slotPosition=(LogEntryID−firstExpansionOffset) % 512;
}
ELSE
{
    secondExpansionOffset=firstExpansionOffset+(LogEntryID−firstExpansionOffset) % 512+1;
    slotPosition=(LogEntryID−secondExpansionOffset) % 768;
}

The above logic may be extended to find slot numbers for log entry identifiers after adding further expansions to the log by, each time an expansion is added, storing the identifier of the last log entry added to the log 154 prior to adding any log entries to the expansion.

Figure 8:
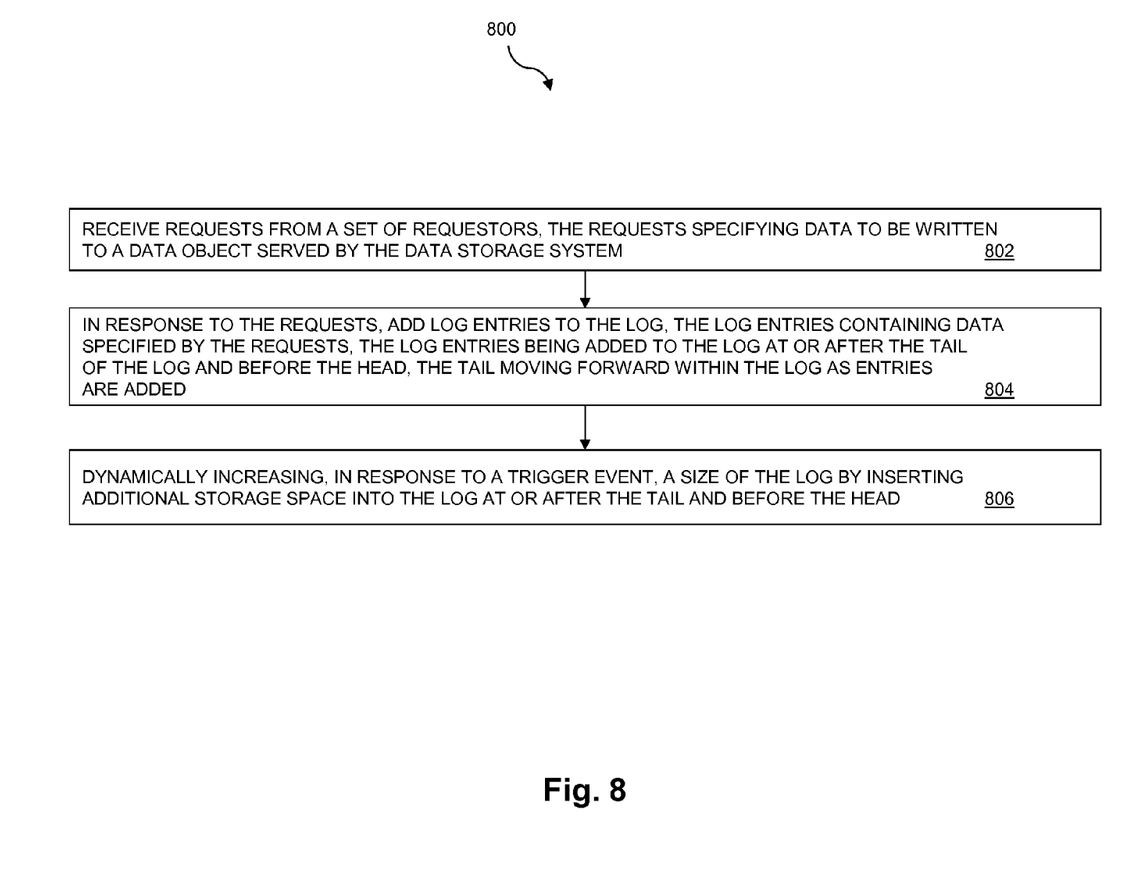
FIG. 8 is a flow chart showing an example of a process for managing a circular transaction log using the disclosed technique.

FIG. 8 shows an example of a process 800 that may be carried out in connection with the computing environment of FIG. 1. The process is typically performed by the software constructs described above in connection with FIGS. 1-7, and which reside in the memory 130 of SP 120 and are run by the set of processing units 124. The various acts of the process 800 may be ordered in any suitable way. Accordingly, embodiments may be constructed in which acts are performed in orders different from those illustrated, which may include performing some acts simultaneously, even though the acts are shown as sequential in the illustrated embodiments.

At 802, requests are received from a set of requestors. For example, the data storage system 116 receives write requests 114 from a set of host systems, such as one or more of hosts 110(1-N). The requests specify data to be written to a data object served by the data storage system. For example, the requests specify data to be written to a data object within data objects 152.

At 804, in response to the requests, log entries are added to a log, such as transaction log 154. The log entries added to the log contain data specified by the requests, and are added to the log at or after a tail of the log, e.g. at or after tail 140, and before a head of the log, e.g. before head 142. The tail moves forward within the log as log entries are added to the log.

At 806, a size of the log is dynamically increased in response to a trigger event. For example, log manager 134 may dynamically increase the size of transaction log 154 in response to a trigger event. The trigger event may, for example, indicate that the log has reached a threshold level of fullness. The size of the log is dynamically increased by inserting additional storage space into the log at or after the tail and before the head. For example, the additional space is inserted at or after tail 140 and before head 142 of the illustrative transaction log 154.

Having described certain embodiments, numerous alternative embodiments or variations can be made. For example, while the above description makes reference to a storing data specified by write requests into log entries within a transaction log, the disclosed technique is not so limited. Accordingly, those skilled in the art will recognize that the disclosed technique may alternatively be applied to storing metadata into log entries within a transaction log. Also, while the above description makes reference to a log in which each slot store a single log entry, the disclosed technique is not limited to such a log, and variations may be applied to logs in which log entries may extend over multiple slots, and/or to logs in which log entries have varying sizes.

In addition, while certain sizes of objects such as logs and log entries are used within examples given in the above description (e.g. initial log size, expansion size, log entry size, etc.), the specific sizes given are only for purposes of explanation, and those skilled in the art will further recognize that the disclosed technique may be embodied using other specific sizes for one or more of the objects described, as may be appropriate for certain configurations, deployments, and/or operational environments.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing a circular transaction log in a data storage system, the log having a head and a tail, the method comprising:

receiving, by a storage processor of the data storage system from a set of remote requestors, requests specifying data to be written to a data object served to the remote requestors by the data storage system;

in response to receiving the requests, adding, by the storage processor, log entries to the log, each log entry containing data specified by a corresponding one of requests, the log entries being added to the log at or after the tail of the log and before the head and being flushed from the log at the head, the tail moving forward within the log towards the head as the log entries are added;

dynamically increasing, by the storage processor in response to a trigger event indicating that the log is nearly full, a size of the log by inserting additional storage space into the log at or after the tail and before the head, wherein inserting the additional storage space into the log at or after the tail and before the head enables log entries to continue to be added to the log within the additional storage space without any log entries being flushed at the head, in order to account for a rate at which entries are added to the log exceeding a rate at which entries are flushed from the log, without entries currently stored in the log being moved or copied to a larger sized log; and synchronizing data contained in log entries to the data object that is served to the remote requestors when log entries are flushed from the log.

2. The method of claim 1, further comprising, in response to a second trigger event that occurs after inserting a first set of additional storage space to the log:

detecting whether log entries have been flushed from the log up to and including a last log entry added to the log before the first set of additional storage space was used to store any log entries; and further increasing the size of the log by inserting a second set of additional storage space into the log responsive to detecting that log entries have been flushed from the log up to and including a last log entry added to the log before the first set of additional storage space was used to store any log entries.

3. The method of claim 1, wherein the log is implemented within a range of contiguous physical addresses of a file system operated by the data storage system, and wherein inserting additional storage space into the log includes provisioning an extent of contiguous physical addresses to the file system for use by the log to store log entries.

4. The method of claim 3, further comprising dynamically contracting the log by:

detecting a contraction trigger, the contraction trigger indicating that the previously inserted additional storage space is no longer needed to store log entries; and removing the previously inserted storage space from the log in response to detecting the contraction trigger, such that the extent of contiguous physical addresses is no longer available for use by the log to store log entries and may be provisioned for another purpose.

5. The method of claim 1, wherein the trigger event indicates that a rate at which requests were received during a previous time period exceeds a threshold rate; and wherein the threshold is a maximum rate at which requests can be received without the log becoming full.

6. The method of claim 1, further comprising:

flushing previously added log entries from the log, wherein the log entries being flushed are located at or after the head of the log and before the tail, wherein flushing the log entries located at or after the head of the log and before the tail from the log includes synchronizing data contained in the log entries located at or after the head of the log and before the tail to the data object served by the storage system by writing the data contained in the log entries located at or after the head of the log and before the tail to the data object served to the remote requestors by the data storage system and moving the head forward within the log toward the tail as log entries are flushed; and wherein the trigger event indicates that a rate at which log entries were flushed from the log during a previous time period fell below a threshold, wherein the threshold is a minimum rate at which log entries must be flushed without the log becoming full.

7. The method of claim 1, wherein the log is made up of a plurality of sequentially numbered slots, each slot operable to store one of the log entries, and wherein adding each log entry to the log includes storing the log entry to a slot indicated by the tail of the log and moving the tail of the log forward to a next slot after adding the log entry, and further comprising:

assigning a unique identifier to each log entry added to the log, by assigning sequentially higher integer values to sequentially added log entries;

storing an identifier of a last log entry added to the log prior to using the additional storage space to store any log entries; and after inserting the additional storage space into the log, calculating a position of a slot storing a log entry based on an identifier assigned to the log entry and the identifier of the last log entry added to the log prior to using the additional storage space to store any log entries.

8. A data storage system, comprising a storage processor having control circuitry that includes a set of processing units coupled to memory, the control circuitry of the storage processor constructed and arranged to:

receive, from a set of remote requestors, requests specifying data to be written to a data object served to the remote requestors by the data storage system;

in response to receiving the requests, add log entries to the log, each log entry containing data specified by a corresponding one of the requests, the log entries being added to the log at or after the tail of the log and before the head and being flushed from the log at the head, the tail moving forward within the log towards the head as the log entries are added;

dynamically increase, in response to a trigger event indicating that the log is nearly full, a size of the log by inserting additional storage space into the log at or after the tail and before the head, wherein inserting the additional storage space into the log at or after the tail and before the head enables log entries to continue to be added to the log within the additional storage space without any log entries being flushed at the head, in order to account for a rate at which entries are added to the log exceeding a rate at which entries are flushed from the log, without entries currently stored in the log being moved or copied to a larger sized log; and synchronize data contained in log entries to the data object that is served to the remote requestors when log entries are flushed from the log.

9. The data storage system of claim 8, the control circuitry further constructed and arranged to, in response to a second trigger event that occurs after inserting a first set of additional storage space to the log:

detect whether log entries have been flushed from the log up to and including a last log entry added to the log before the first set of additional storage space was used to store any log entries; and further increase the size of the log by inserting a second set of additional storage space into the log responsive to detecting that log entries have been flushed from the log up to and including a last log entry added to the log before the first set of additional storage space was used to store any log entries.

10. The data storage system of claim 8, wherein the log is implemented within a range of contiguous physical addresses of a file system operated by the data storage system, and wherein inserting additional storage space into the log includes provisioning an extent of contiguous physical addresses to the file system for use by the log to store log entries.

11. The data storage system of claim 10, the control circuitry further constructed and arranged to dynamically contract the log by:

detecting a contraction trigger, the contraction trigger indicating that the previously inserted additional storage space is no longer needed to store log entries; and removing the previously inserted storage space from the log in response to detecting the contraction trigger, such that the extent of contiguous physical addresses is no longer available for use by the log to store log entries and may be provisioned for another purpose.

12. The data storage system of claim 8, wherein the trigger event indicates that a rate at which requests were received during a previous time period exceeds a threshold rate; and
   wherein the threshold is a maximum rate at which requests can be received without the log becoming full.

13. The data storage system of claim 8, the control circuitry further constructed and arranged to:
   flush previously added log entries from the log, the log entries being flushed located at or after the head of the log and before tail, wherein flushing the log entries located at or after the head of the log and before the tail from the log includes synchronizing data contained in the log entries located at or after the head of the log and before the tail to the data object served by the storage system by writing the data contained in the log entries located at or after the head of the log and before the tail to the data object served to the remote requestors by the data storage system and moving the head forward within the log toward the tail as log entries are flushed; and
   wherein the trigger event indicates that a rate at which log entries were flushed from the log during a previous time period fell below a threshold, wherein the threshold is a minimum rate at which log entries must be flushed without the log becoming full.

14. The data storage system of claim 8, wherein the log is made up of a plurality of sequentially numbered slots, each slot operable to store one of the log entries, and wherein adding each log entry to the log includes storing the log entry to a slot indicated by the tail of the log and moving the tail of the log forward to a next slot after adding the log entry, and wherein the control circuitry is further constructed and arranged to:
   assign a unique identifier to each log entry added to the log, by assigning sequentially higher integer values to sequentially added log entries;
   store an identifier of a last log entry added to the log prior to using the additional storage space to store any log entries; and
   after inserting the additional storage space into the log, calculate a position of a slot storing a log entry based on an identifier assigned to the log entry and the identifier of the last log entry added to the log prior to using the additional storage space to store any log entries.

15. The method of claim 8, wherein the trigger event indicating that the log is nearly full is issued responsive to detecting that the tail indicates a slot that immediately precedes a slot indicated by the head, whereby the trigger event indicating that the log is nearly full occurs when only a single slot is available for storing a log entry.

16. A computer program product including a set of non-transitory, computer-readable media having instructions which, when executed by control circuitry of a data storage system, cause the control circuitry to perform a method of managing a circular transaction log in a data storage system, the method comprising:
   receiving, by a storage processor of the data storage system from a set of remote requestors, requests specifying data to be written to a data object served to the remote requestors by the data storage system;
   in response to receiving the requests, adding, by the storage processor, log entries to the log, each log entry containing data specified by a corresponding one of the requests, the log entries being added to the log at or after the tail of the log and before the head and being flushed from the log at the head, the tail moving forward within the log towards the head as the log entries are added;
   dynamically increasing, by the storage processor in response to a trigger event indicating that the log is nearly full, a size of the log by inserting additional storage space into the log at or after the tail and before the head, wherein inserting the additional storage space into the log at or after the tail and before the head enables log entries to continue to be added to the log within the additional storage space without any log entries being flushed at the head, in order to account for a rate at which entries are added to the log exceeding a rate at which entries are flushed from the log, without entries currently stored in the log being moved or copied to a larger sized log; and
   synchronizing data contained in log entries to the data object that is served to the remote requestors when log entries are flushed from the log.

17. The computer program product of claim 16, the method further comprising, in response to a second trigger event that occurs after inserting a first set of additional storage space to the log:
   detecting whether log entries have been flushed from the log up to and including a last log entry added to the log before the first set of additional storage space was used to store any log entries; and
   further increasing the size of the log by inserting a second set of additional storage space into the log responsive to detecting that log entries have been flushed from the log up to and including a last log entry added to the log before the first set of additional storage space was used to store any log entries.

18. The computer program product of claim 16, wherein the log is implemented within a range of contiguous physical addresses of a file system operated by the data storage system, and
   wherein inserting additional storage space into the log includes provisioning an extent of contiguous physical addresses to the file system for use by the log to store log entries.

19. The computer program product of claim 18, wherein the method further comprises:
   dynamically contracting the log by
   detecting a contraction trigger, the contraction trigger indicating that the previously inserted additional storage space is no longer needed to store log entries, and
   removing the previously inserted storage space from the log in response to detecting the contraction trigger, such that the extent of contiguous physical addresses is no longer available for use by the log to store log entries and may be provisioned for another purpose.

20. The method of claim 15, wherein the storage processor is communicably coupled to a network through a communication interface of the storage processor;
   wherein the set of remote requestors comprises a plurality of host computing devices that are also communicably coupled to the network;
   wherein receiving the requests by the storage processor from the set of remote requestors comprises receiving, through the communication interface of the storage processor, write requests that were transmitted by the host computing devices over the network; and
   wherein for each one of the requests, responsive to the storage processor storing the data specified by the request into a corresponding one of the log entries added to the log, the storage processor transmits an acknowledgement message indicating completion of the request, through the communication interface of the storage processor over the network to a host computing device that transmitted the request to the storage processor.

\* \* \* \* \*